US010277146B2

(12) United States Patent
Wang et al.

(10) Patent No.: US 10,277,146 B2
(45) Date of Patent: Apr. 30, 2019

(54) HALF BRIDGE INVERTER UNITS AND INVERTER THEREOF

(71) Applicants: Hongliang Wang, Kingston (CA); Yan-Fei Liu, Kingston (CA)

(72) Inventors: Hongliang Wang, Kingston (CA); Yan-Fei Liu, Kingston (CA)

( * ) Notice: Subject to any disclaimer, the term of this patent is extended or adjusted under 35 U.S.C. 154(b) by 0 days.

(21) Appl. No.: 15/547,005

(22) PCT Filed: Jan. 29, 2016

(86) PCT No.: PCT/CN2016/072701
§ 371 (c)(1),
(2) Date: Jul. 27, 2017

(87) PCT Pub. No.: WO2016/119737
PCT Pub. Date: Aug. 4, 2016

(65) Prior Publication Data
US 2018/0019688 A1    Jan. 18, 2018

Related U.S. Application Data

(60) Provisional application No. 62/109,431, filed on Jan. 29, 2015.

(51) Int. Cl.
*H02M 7/797* (2006.01)
*H02M 3/155* (2006.01)
*H02J 3/38* (2006.01)

(52) U.S. Cl.
CPC ........... *H02M 7/797* (2013.01); *H02M 3/155* (2013.01); *H02J 3/383* (2013.01)

(58) Field of Classification Search
CPC ........ H02M 3/155; H02M 3/156; H02M 7/79; H02M 7/797; H02J 3/383
See application file for complete search history.

(56) References Cited

U.S. PATENT DOCUMENTS

| | | | | |
|---|---|---|---|---|
| 6,166,513 | A  * | 12/2000 | Hammond | H02M 7/49 318/762 |
| 6,330,170 | B1 * | 12/2001 | Wang | H02J 9/062 363/17 |
| 9,960,687 | B2 * | 5/2018 | Elasser | H02M 3/33507 |
| 2011/0007537 | A1 * | 1/2011 | Fornage | H02M 1/08 363/132 |
| 2017/0353111 | A1 * | 12/2017 | Elasser | H02M 1/08 |

FOREIGN PATENT DOCUMENTS

WO    WO 2008024529    *  2/2008

\* cited by examiner

*Primary Examiner* — Matthew Nguyen

(57) ABSTRACT

Disclosed are half bridge inverter unit and inverter thereof. The half bridge inverter unit includes an inverter controlling module and inductors. The inverter controlling module provides different connection modes based on different operation modes so that the inverter meets the requirement of wide input voltage range as it can work in either voltage step-up mode or voltage step-down mode. The mid-point voltage between the DC series capacitors connected in parallel with DC power supply can be balanced automatically by taking advantage of the grid voltage symmetry with regard to positive and negative half cycles. The inverter is of single stage structure. It has advantages of low power loss, low cost, high efficiency and reliability.

22 Claims, 10 Drawing Sheets

(a) (b)

(c) (d)

(a) (b)

(c)                        (d)

HALF BRIDGE INVERTER UNITS AND INVERTER THEREOF

RELATED APPLICATIONS

This application claims the benefit of the filing date of U.S. Provisional Application No. 62/109,431, filed on Jan. 29, 2015, the contents of which are hereby incorporated by reference in their entirety.

FIELD OF THE INVENTION

The invention relates to inverter units and inverter in power electronics field, especially to half bridge inverter.

BACKGROUND

With the increasing threat of global energy shortage and serious environmental problems, renewable energy has been developing fast. Photovoltaic industry has an extensive future as its resources are plentiful and widespread. It is an important issue to lower cost and improve efficiency for photovoltaic system.

Inverter is used to convert DC from photovoltaic arrays into AC in photovoltaic system. There are two kinds of grid-connected inverters. They are isolated and non-isolated ones. The transformer is used in the former to keep human electrically safe. But because of its power loss and huge volume, it results in many problems, such as low efficiency and power density, and high cost. Therefore, the non-isolated inverter in photovoltaic system is popular. However, there is a common mode loop circuit for the absence of transformer in the non-isolated inverter system. The loop circuit produces leakage current which is dangerous to devices and human. So the leakage current becomes a critical issue to be solved for the non-isolated inverter system. At the same time, high efficiency is becoming another goal for the photovoltaic industry.

It is required to meet a wide range of input voltage for the non-isolated inverter as there is a huge scope of the fluctuation of the output voltage from photovoltaic arrays. However, there is a minimum input voltage for the non-isolated inverter working normally in photovoltaic system. It is possible for the output voltage from photovoltaic arrays to be less than the minimum input voltage. So a boost circuit is usually used in the photovoltaic inverter system.

As is known, there is a two-stage circuit in the present photovoltaic inverter system shown in FIG. 1. The first stage is DC-DC unit which usually employs the boost circuit. The second stage is DC-AC unit. When the output voltage from photovoltaic arrays is less than the minimum input voltage, the DC-DC unit works to boost the input voltage so that the DC-AC unit can work normally; otherwise, the DC-DC unit is bypassed while the DC-AC unit works normally. The two stages are connected in series so that it lowers efficiency of the whole system and increases cost.

A single stage full bridge inverter shown in FIG. 2 is disclosed in the reference of "Derivation, Analysis, and Implementation of a Boost-Buck Converter-Based High-Efficiency PV Inverter". However, it costs much in case of multiple photovoltaic arrays. In addition, the efficiency is low when there are great differences among the numbers of photovoltaic cells in multiple photovoltaic arrays. The output voltage from each photovoltaic array is required to be same because they are connected in parallel. So the output voltage of each photovoltaic array is raised in various degrees. It lowers the system efficiency. As well known, it is difficult for the full bridge inverter to cancel substantially the high frequency leakage current because of the parasitic factors within the inverter system. Furthermore, it costs much because it needs two AC filtering inductors and their magnetic cores are not common for the full bridge structure.

SUMMARY

To solve the above problems, a half bridge inverter unit and inverter thereof are provided in the invention.

To make sure the current flows in both directions, each semiconductor switch is connected in reverse parallel with a diode. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

According to a first aspect of the invention, there is provided a half bridge inverter unit. It comprises an inverter controlling module and a first inductor, and has a first input terminal, a second input terminal, a third input terminal, a first voltage output terminal, a second voltage output terminal and several controlling terminals.

The inverter controlling module is connected to all the three input terminals, the two voltage output terminals, two terminals of the first inductor and the several controlling terminals.

Based on the controlling signals from the controlling terminals under a first operation mode, the inverter controlling module makes current flow between a first terminal of the first inductor and the first input terminal and between a second terminal of the first inductor and the first voltage output terminal; based on the controlling signals from the controlling terminals under a second operation mode, the inverter controlling module makes current flow between the first terminal of the first inductor and the second input terminal and between the second terminal of the first inductor and the first voltage output terminal; based on the controlling signals from the controlling terminals under a third operation mode, the inverter controlling module makes current flow between the first terminal of the first inductor and the first input terminal and between the second terminal of the first inductor and the second voltage output terminal; based on the controlling signals from the controlling terminals under a fourth operation mode, the inverter controlling module makes current flow between the first terminal of the first inductor and the second input terminal and between the second terminal of the first inductor and the second voltage output terminal.

According to a second aspect of the invention, there is provided a single phase half bridge inverter.

The single phase half bridge inverter comprises the said half bridge inverter unit provided in the first aspect and a controller that is connected to the several controlling terminals of the half bridge inverter unit. The controller is used to provide the half bridge inverter unit with corresponding control signals to each operation mode.

According to a third aspect of the invention, there is provided a three-phase half bridge inverter.

The three-phase half bridge inverter comprises three of the said half bridge inverter units provided in the first aspect and a controller. All the first input terminals of the three half bridge inverter units are connected together; all the second input terminals of the three half bridge inverter units are connected together, all the third input terminals of the three half bridge inverter units are connected together; the first voltage output terminals of the three half bridge inverter units are connected one to one to the three-phase AC load terminals of the three-phase half bridge inverter and meanwhile all the second voltage output terminals are connected together, or the second voltage output terminals of the three half bridge inverter units are connected one to one to the three-phase AC load terminals of the three-phase half bridge inverter and meanwhile all the first voltage output terminals are connected together. The controller is connected to the several controlling terminals of each half bridge inverter unit and provides the three half bridge inverter units with corresponding control signals to each operation mode.

The half bridge inverter unit and inverter thereof provided in this invention meets the requirement of a wide range of input voltage for the inverter as it can operate in either a buck mode or a boost mode. It also solves the problem of mid-point voltage balance of the two series capacitors connected in parallel to DC power supply taking advantage of the symmetry of grid voltage in two half cycles. It achieves low cost, high efficiency and reliability by using a single stage structure with low power loss.

The half bridge inverter unit and inverter thereof provided in the invention can be used for, but not limited to, renewable energy power system, such as single-phase or three-phase grid-connected photovoltaic system.

BRIEF DESCRIPTION OF THE DRAWINGS

For a more complete understanding of the present invention, reference is now made to the following description taken in conjunction with accompanying drawings, in which:

FIG. 3 (*b*) is the circuit diagram in partial block form of a second kind of single phase half bridge inverter according to an embodiment of the invention.

FIG. 4 (*b*) is the second schematic circuit diagram of the first circuit module M1 according to an embodiment of the invention.

FIG. 4 (*c*) is the third schematic circuit diagram of the first circuit module M1 according to an embodiment of the invention.

FIG. 4 (*d*) is the fourth schematic circuit diagram of the first circuit module M1 according to an embodiment of the invention.

FIG. 5 (*b*) is the second schematic circuit diagram of the second circuit module M2 according to an embodiment of the invention, FIG. 5 (*c*) is the third schematic circuit diagram of the second circuit module M2 according to an embodiment of the invention.

FIG. 5 (*d*) is the fourth schematic circuit diagram of the second circuit module M2 according to an embodiment of the invention.

FIG. 20(*b*) is an equivalent block diagram of the second kind of single phase half bridge inverter according to an embodiment of the invention.

FIG. 21(*b*) is the circuit diagram in partial block form of a second kind of three-phase half bridge inverter based on the equivalent circuit in FIG. 20(*b*) according to an embodiment of the invention.

FIG. 21(*c*) is the circuit diagram in partial block form of a third kind of three-phase half bridge inverter based on the equivalent circuit in FIG. 20(*a*) according to an embodiment of the invention.

FIG. 21(*d*) is the circuit diagram in partial block form of a fourth kind of three-phase half bridge inverter based on the equivalent circuit in FIG. 20(*b*) according to an embodiment of the invention.

For convenience of description, identical components have been given the same reference numbers in the various drawings. The same symbols like "∇", "↓" used in one drawing are intended to refer to be connected together.

DETAILED DESCRIPTION OF EMBODIMENTS

Figure 1:
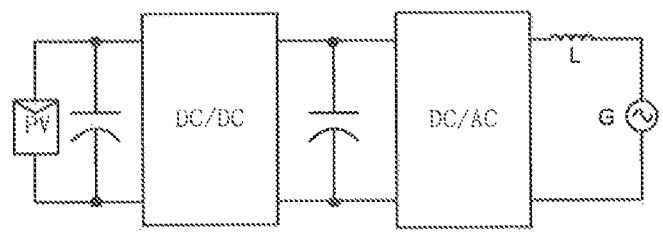
FIG. 1 is a circuit diagram in partial block form of the present two-stage inverter system.
Figure 2:
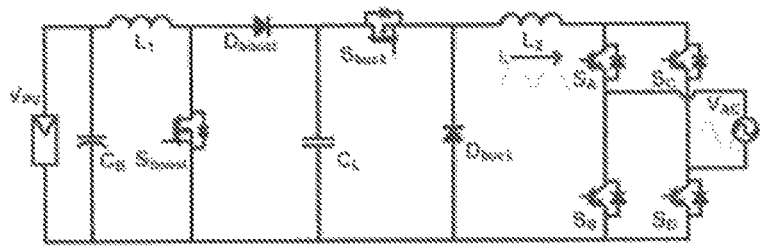
FIG. 2 is a circuit diagram of the present single stage full-bridge inverter system.

Provided herein are half bridge inverter units and inverter thereof. For a better understanding of the invention, and to show more clearly how it may be carried into effect, embodiments will be described in detail with reference of the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

The half bridge inverter unit provided in this invention comprises an inverter controlling module and a first inductor, and has a first input terminal, a second input terminal, a third input terminal, a first voltage output terminal, a second voltage output terminal and several controlling terminals.

The inverter controlling module is connected to all the three input terminals, the two voltage output terminals, two terminals of the first inductor and the several controlling terminals.

Based on the controlling signals from the controlling terminals under a first operation mode, the inverter controlling module makes current flow between a first terminal of the first inductor and the first input terminal and between a second terminal of the first inductor and the first voltage output terminal; based on the controlling signals from the controlling terminals under a second operation mode, the inverter controlling module makes current flow between the first terminal of the first inductor and the second input terminal and between the second terminal of the first inductor and the first voltage output terminal; based on the controlling signals from the controlling terminals under a third operation mode, the inverter controlling module makes current flow between the first terminal of the first inductor and the first input terminal and between the second terminal of the first inductor and the second voltage output terminal; based on the controlling signals from the controlling terminals under a fourth operation mode, the inverter controlling module makes current flow between the first terminal of the first inductor and the second input terminal and between the second terminal of the first inductor and the second voltage output terminal.

The half bridge inverter unit provided in this invention controls the inverter controlling module by controlling signals so that it can work in either voltage step-up mode or voltage step-down mode. So the inverter with the half bridge inverter unit meets the requirement of wide input voltage range. The mid-point voltage between the DC series capacitors connected in parallel with DC power supply can be balanced automatically by taking advantage of the grid voltage symmetry with regard to positive and negative half cycles. The inverter is of single stage structure. It has advantages of low power loss, low cost, high efficiency and reliability.

The said inverter controlling module can be implemented by many structural circuits in practical situations. Take a simple circuit for example. There are four switching circuit branches in the inverter controlling module. A first switching circuit branch is connected between the first input terminal and the first terminal of the first inductor; a second switching circuit branch is connected between the second input terminal and the first terminal of the first inductor; a third switching circuit branch is connected between the first voltage output terminal and the second terminal of the first inductor; a fourth switching circuit branch is connected between the second voltage output terminal and the second terminal of the first inductor.

Some of possible examples of the said inverter controlling module will be described in details with reference of the accompanying drawings. For convenience of description, some accompanying drawings show other circuit part besides the half bridge inverter unit, such as the capacitors used to form power supplies, DC-DC converter, photovoltaic arrays and so on.

Figure 3:
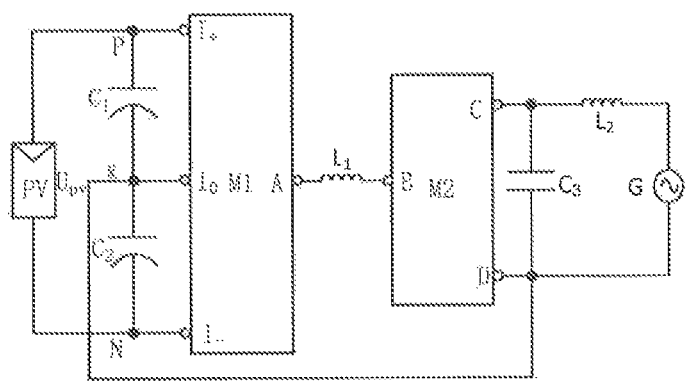
FIG. 3 (*a*) is the circuit diagram in partial block form of a first kind of single phase half bridge inverter according to an embodiment of the invention.
Figure 3:
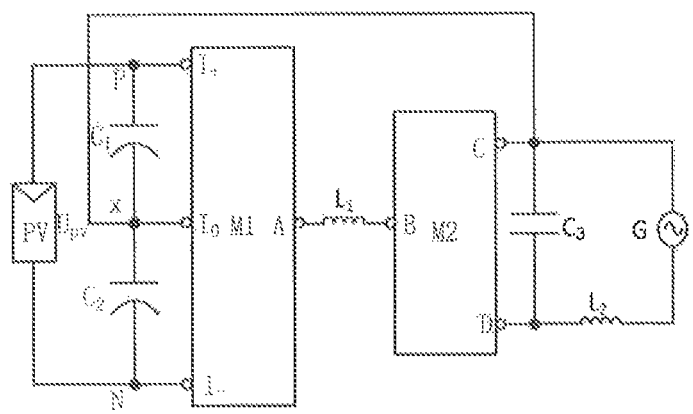

As shown in FIG. 3, the term "PV" as used herein is intended to refer to photovoltaic arrays (i.e. DC power supply), $U_{PV}$ is its DC output voltage, M1 is a first circuit module in the half bridge inverter unit, M2 is a second circuit module, $C_1$ is a first capacitor (i.e. the first DC power supply), $C_2$ is a second capacitor (i.e. the second DC power supply), $C_3$ is a third capacitor and G is AC power grid.

Of course, the PV is able to be replaced by the other DC power supply. That is to say, the DC power supply is not limited to PV in the invention. Similarly, the AC power grid G can be replaced by the other AC load. So the AC load in this invention is not limited to the AC power grid G.

Notice that diodes are used for the element characterized by single directional conduction in the invention, but not limited to diodes. The positive terminal of diode is referred to Anode and the negative terminal is Cathode.

The kind of switch MOSFET is used for the said controllable (on and off) semiconductor switch in the invention. Take the N-channel MOSFET for example. The first terminal of N-channel MOSFET is referred to Drain, the second terminal is Source and the control terminal is Gate. The control terminal of each semiconductor switch in the said half bridge inverter unit is provided with its own control signal. For the sake of brevity, it is not described repeatedly below.

To make sure the current in the branch of each semiconductor switch located flows in both directions, each semiconductor switch in the invention is reversely parallel connected to a diode. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The said semiconductor switch can also be implemented by the other kind of transistor, for example, the NPN type transistor. For the NPN type transistor, the first terminal is referred to Collector terminal, the second terminal is Emitter and the control terminal is Base. Of course, the semiconductor switch is not limited to MOSFET or NPN type transistor. That is to say, the other triode with characteristics of controllable alternative states (on and off) is able to be used as the said semiconductor switch in the invention.

As shown in FIG. 3, the photovoltaic arrays (PV) is connected in parallel to two capacitors in series. They are the first capacitor ($C_1$) and the second capacitor ($C_2$). The first capacitor ($C_1$) works as the first power supply and the second capacitor ($C_2$) works as the second power supply. The negative terminal of the first capacitor ($C_1$) is connected to the positive terminal of the second capacitor ($C_2$). The positive terminal of the first capacitor ($C_1$) is connected to the positive terminal of the photovoltaic arrays (PV) and the negative terminal of the second capacitor ($C_2$) is connected to the negative terminal of the photovoltaic arrays (PV).

The half bridge inverter unit comprises the first circuit module (M1), the second circuit module (M2) and the first inductor ($L_1$). The first circuit module (M1) is connected to some of the said several controlling terminals and the second circuit module (M2) is connected to the others of the said several controlling terminals.

The first circuit module (M1) comprises at least an upper input terminal ($I_+$), a middle input terminal ($I_0$), a lower input terminal ($I_-$), an output terminal (A), a first switching circuit branch and a second switching circuit branch.

The upper input terminal ($I_+$) of the first circuit module (M1) is connected to the first input terminal of the half bridge inverter unit; the middle input terminal ($I_0$) is connected to the third input terminal; the lower input terminal ($I_-$) is connected to the second input terminal. The output terminal (A) is connected to the first terminal (left terminal in the accompanying drawings) of the first inductor ($L_1$). For convenience of description, the symbol "$I_+$" is also used to refer to the first input terminal of the half bridge inverter unit. Similarly, the symbol "$I_-$" is also used to refer to the second input terminal and the symbol "$I_0$" refer to the third input terminal.

The upper input terminal ($I_+$) of the first circuit module (M1) is connected to the positive terminal of the first capacitor ($C_1$); the middle input terminal ($I_0$) is connected to the common terminal of the first capacitor ($C_1$) and the second capacitor ($C_2$); the lower input terminal ($I_-$) is connected to the negative terminal of the second capacitor ($C_2$). The first switching circuit branch in the first circuit module (M1) is connected between the upper input terminal ($I_+$) and the output terminal (A) of the first circuit module (M1); the second switching circuit branch in the first circuit module (M1) is connected between the lower input terminal ($I_-$) and the output terminal (A) of the first circuit module (M1).

The first circuit module provides at least two operation modes based on the controlling signals from the controlling terminals: (1) current flows between the output terminal and the upper input terminal of the first circuit module; (2) current flows between the output terminal and the lower input terminal of the first circuit module.

In some embodiments, the first circuit module (M1) further comprises a third switching circuit branch. The third switching circuit branch in the first circuit module (M1) is connected between the middle input terminal ($I_0$) and the output terminal (A) of the first circuit module (M1). In this case, the first circuit module can provide another operation mode based on the controlling signals from the controlling terminals: current flows between the middle input terminal and the output terminal of the first circuit module.

The second circuit module (M2) comprises an input terminal (B), a first output terminal (C), a second output terminal (D), a first switching circuit branch and a second switching circuit branch.

The input terminal (B) of the second circuit module (M2) is connected to the second terminal (right terminal in the accompanying drawings) of the first inductor ($L_1$). The first output terminal (C) is connected to the said first voltage output terminal and the second output terminal (D) is connected to the said second voltage output terminal.

The first output terminal (C) of the second circuit module (M2) is connected to the common terminal of the first capacitor (C) and the second capacitor ($C_2$), or the second output terminal (D) of the second circuit module (M2) is connected to the common terminal of the first capacitor ($C_1$) and the second capacitor ($C_2$). Both the first output terminal (C) and the second output terminal (D) of the second circuit module (M2) are used as AC terminals to connect to AC loads. The first switching circuit branch in the second circuit module (M2) is connected between the input terminal (B) and the first output terminal (C) of the second circuit module (M2); the second switching circuit branch in the second circuit module (M2) is connected between the input terminal (B) and the second output terminal (D) of the second circuit module (M2).

The second circuit module provides at least two operation modes based on the controlling signals from the controlling terminals: (1) current flows between the input terminal and the first output terminal of the second circuit module; (2) current flows between the input terminal and the second output terminal of the second circuit module.

The first inductor ($L_1$) connects the output terminal (A) of the first circuit module (M1) to the input terminal (B) of the second circuit module (M2). The first inductor ($L_1$) is used to filter the switching high-frequency component to achieve a load current with almost a sinusoidal waveform.

Figure 4:
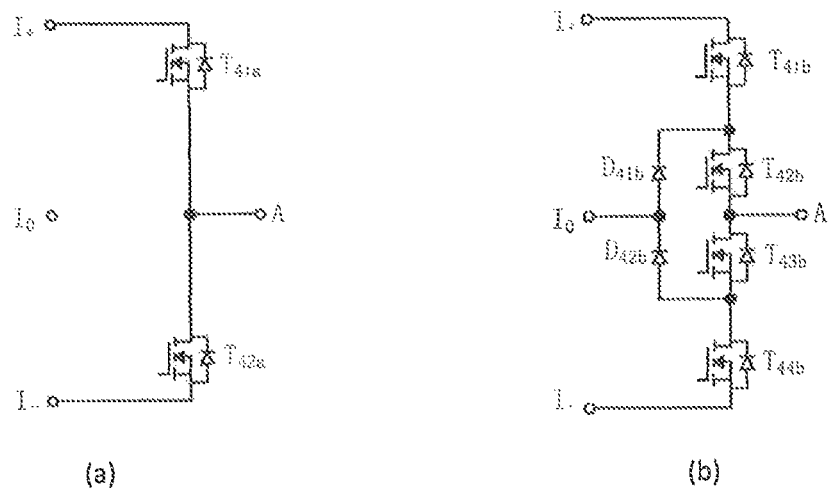
FIG. 4 (*a*) is the first schematic circuit diagram of the first circuit module M1 according to an embodiment of the invention.
Figure 4:
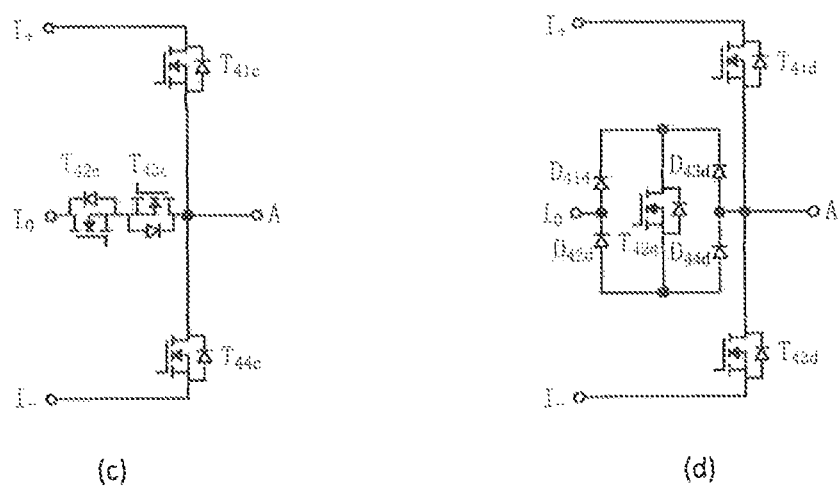

FIG. 4 (a) shows the first schematic circuit diagram of the first circuit module M1 according to an embodiment of the invention. The first circuit module (M1) comprises a first bidirectional switch ($T_{41a}$) and a second bidirectional switch ($T_{42b}$).

The first terminal of the first bidirectional switch ($T_{41a}$) is connected to the upper input terminal ($I_+$) of the first circuit module (M1) and the second terminal of the first bidirectional switch ($T_{41a}$) is connected to both the output terminal (A) of the first circuit module (M1) and the first terminal of the second bidirectional switch ($T_{42a}$). The second terminal of the second bidirectional switch ($T_{42a}$) is connected to the lower input terminal ($I_-$) of the first circuit module (M1).

The first switching circuit branch in the first circuit module (M) comprises the first bidirectional switch ($T_{41a}$) and the second switching circuit branch comprises the second bidirectional switch ($T_{42a}$).

FIG. 4 (b) shows the second schematic circuit diagram of the first circuit module M1 according to an embodiment of the invention. The first circuit module (M1) comprises a first bidirectional switch ($T_{41b}$), a second bidirectional switch ($T_{42b}$), a third bidirectional switch ($T_{43b}$), a fourth bidirectional switch ($T_{44b}$), a first diode ($D_{41b}$) and a second diode ($D_{42b}$).

The first terminal of the first bidirectional switch ($T_{41b}$) is connected to the upper input terminal ($I_+$) of the first circuit module (M1) and the second terminal of the first bidirectional switch ($T_{41b}$) is connected to both the negative terminal of the first diode ($D_{41b}$) and the first terminal of the second bidirectional switch ($T_{42b}$). The second terminal of the second bidirectional switch ($T_{42b}$) is connected to both the first terminal of the third bidirectional switch ($T_{43b}$) and the output terminal (A) of the first circuit module (M1). The second terminal of the third bidirectional switch ($T_{43b}$) is connected to both the positive terminal of the second diode ($D_{42b}$) and the first terminal of the fourth bidirectional switch ($T_{44b}$). The second terminal of the fourth bidirectional switch ($T_{44b}$) is connected to the lower input terminal ($I_-$) of the first circuit module (M1). The positive terminal of the first diode ($D_{41b}$) is connected to the negative terminal of the second diode ($D_{42b}$). The common terminal of the first diode ($D_{41b}$) and the second diode ($D_{42b}$) is connected to the middle input terminal ($I_0$) of the first circuit module (M1).

The first switching circuit branch in the first circuit module (M1) comprises the first bidirectional switch ($T_{41b}$) and the second bidirectional switch ($T_{42b}$). The second switching circuit branch comprises the third bidirectional switch ($T_{43b}$) and the fourth bidirectional switch ($T_{44b}$). The third switching circuit branch comprises the first diode ($D_{41b}$) and the second bidirectional switch ($T_{42b}$), or comprises the second diode ($D_{42b}$) and the third bidirectional switch ($T_{43b}$).

FIG. 4 (c) shows the third schematic circuit diagram of the first circuit module M1 according to an embodiment of the invention. The first circuit module (M1) comprises a first bidirectional switch ($T_{41c}$), a second bidirectional switch ($T_{42c}$), a third bidirectional switch ($T_{43c}$), and a fourth bidirectional switch ($T_{44c}$).

The first terminal of the first bidirectional switch ($T_{43c}$) is connected to the upper input terminal ($I_+$) of the first circuit module (M1) and the second terminal of the first bidirectional switch ($T_{41c}$) is connected to both the output terminal (A) of the first circuit module (M1) and the first terminal of the fourth bidirectional switch ($T_{44c}$). The second terminal of the fourth bidirectional switch ($T_{44c}$) is connected to the lower input terminal ($I_-$) of the first circuit module (M1). The first terminal of the second bidirectional switch ($T_{42c}$) is connected to the middle input terminal ($I_0$) of the first circuit module (M1) and the second terminal of the second bidirectional switch ($T_{42c}$) is connected to the second terminal of the third bidirectional switch ($T_{43c}$). The first terminal of the third bidirectional switch ($T_{43c}$) is connected to the output terminal (A) of the first circuit module (M1).

The first switching circuit branch in the first circuit module (M1) comprises the first bidirectional switch ($T_{41c}$). The second switching circuit branch comprises the fourth bidirectional switch ($T_{44c}$). The third switching circuit branch comprises the second bidirectional switch ($T_{42c}$) and the third bidirectional switch ($T_{43c}$).

FIG. 4 (d) shows the fourth schematic circuit diagram of the first circuit module M1 according to an embodiment of the invention. The first circuit module (M1) comprises a first bidirectional switch ($T_{41d}$), a second bidirectional switch ($T_{42d}$), a third bidirectional switch ($T_{43d}$), a first diode ($D_{41d}$), a second diode ($D_{42d}$), a third diode ($D_{43d}$) and a fourth diode ($D_{44d}$).

The first terminal of the first bidirectional switch ($T_{41d}$) is connected to the upper input terminal ($I_+$) of the first circuit module (M1) and the second terminal of the first bidirectional switch ($T_{41d}$) is connected to both the output terminal (A) of the first circuit module (M1) and the first terminal of the third bidirectional switch ($T_{43d}$). The second terminal of the third bidirectional switch ($T_{43d}$) is connected to the lower input terminal ($I_-$) of the first circuit module (M1). The positive terminal of the first diode ($D_{41d}$) is connected to both the negative terminal of the second diode ($D_{42d}$) and the middle input terminal ($I_0$) of the first circuit module (M1), and the negative terminal of the first diode ($D_{41d}$) is connected to both the negative terminal of the third diode ($D_{43d}$) and the first terminal of the second bidirectional switch ($T_{42d}$). The positive terminal of the second diode ($D_{42d}$) is connected to both the positive terminal of the fourth diode ($D_{44d}$) and the second terminal of the second bidirectional switch ($T_{42d}$). The positive terminal of the third diode ($D_{43d}$) is connected to both the negative terminal of the fourth diode ($D_{44d}$) and the output terminal (A) of the first circuit module (M1).

The first switching circuit branch in the first circuit module (M1) comprises the first bidirectional switch ($T_{41d}$). The second switching circuit branch comprises the third bidirectional switch ($T_{43d}$). The third switching circuit branch comprises the first diode ($D_{41d}$), the fourth diode ($D_{44d}$) and the second bidirectional switch ($T_{42d}$), or comprises the second diode ($D_{42d}$), the third diode ($D_{43d}$) and the second bidirectional switch ($T_{42d}$).

Figure 5:
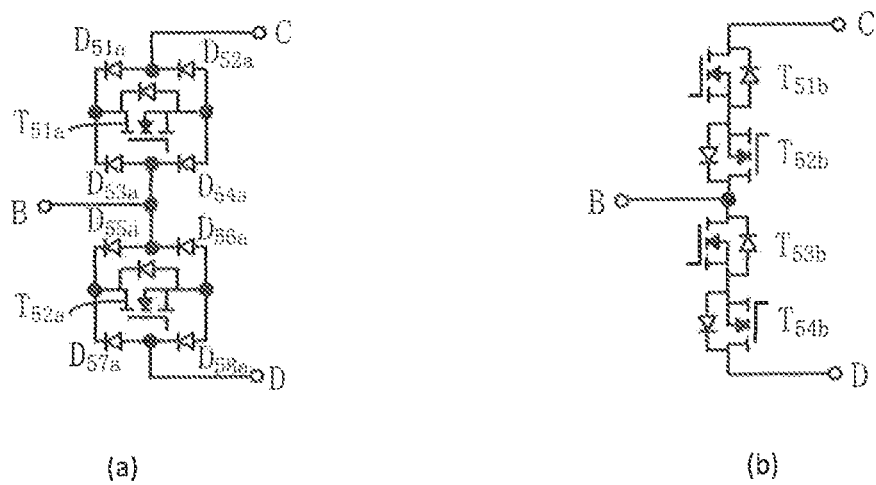
FIG. 5 (*a*) is the first schematic circuit diagram of the second circuit module M2 according to an embodiment of the invention.
Figure 5:
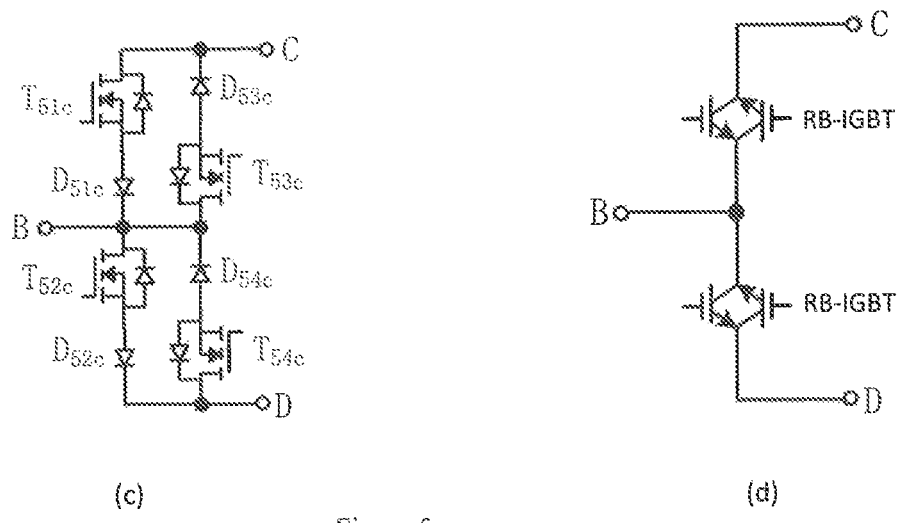

FIG. 5 (a) shows the first schematic circuit diagram of the second circuit module M2 according to an embodiment of the invention. The second circuit module (M2) comprises a first bidirectional switch ($T_{51a}$), a second bidirectional switch ($T_{52a}$) and a first diode ($D_{51a}$)~an eighth diode ($D_{58a}$).

The negative terminal of the first diode ($D_{51a}$) is connected to both the negative terminal of the third diode ($D_{53a}$) and the first terminal of the first bidirectional switch ($T_{51a}$) and the positive terminal of the first diode ($D_{51a}$) is connected to both the negative terminal of the second diode ($D_{52a}$) and the first output terminal (C) of the second circuit module (M2). The positive terminal of the second diode ($D_{52a}$) is connected to both the positive terminal of the fourth diode ($D_{54a}$) and the second terminal of the first bidirectional switch ($T_{51a}$). The positive terminal of the third diode ($D_{53a}$) is connected to both the negative terminal of the fourth diode ($D_{54a}$) and the input terminal (B) of the second circuit module (M2).

The negative terminal of the fifth diode ($D_{55a}$) is connected to both the negative terminal of the seventh diode ($D_{57a}$) and the first terminal of the second bidirectional switch ($T_{52a}$) and the positive terminal of the fifth diode ($D_{55a}$) is connected to both the negative terminal of the sixth diode ($D_{56a}$) and the input terminal (B) of the second circuit module (M2). The positive terminal of the sixth diode ($D_{56a}$) is connected to both the positive terminal of the eighth diode ($D_{58a}$) and the second terminal of the second bidirectional switch ($T_{52a}$). The positive terminal of the seventh diode ($D_{57a}$) is connected to both the negative terminal of the eighth diode ($D_{58a}$) and the second output terminal (D) of the second circuit module (M2).

The first switching circuit branch in the second circuit module (M2) comprises the first bidirectional switch ($T_{51a}$), the second diode ($D_{52a}$) and the third diode ($D_{53a}$), or comprises the first diode ($D_{51a}$), the fourth diode ($D_{54a}$) and the first bidirectional switch ($T_{51a}$). The second switching circuit branch comprises the fifth diode ($D_{55a}$), the eighth diode ($D_{58a}$) and the second bidirectional switch ($T_{52a}$), or comprises the sixth diode ($D_{56a}$), the seventh diode ($D_{57a}$) and the second bidirectional switch ($T_{52a}$).

FIG. 5 (b) shows the second schematic circuit diagram of the second circuit module M2 according to an embodiment of the invention. The second circuit module (M2) comprises a first bidirectional switch ($T_{51b}$), a second bidirectional switch ($T_{52b}$), a third bidirectional switch ($T_{53b}$) and a fourth bidirectional switch ($T_{54b}$).

The first terminal of the first bidirectional switch ($T_{51b}$) is connected to the first output terminal (C) of the second circuit module (M2) and the second terminal of the first bidirectional switch ($T_{51b}$) is connected to the second terminal of the second bidirectional switch ($T_{52b}$). The first terminal of the second bidirectional switch ($T_{52b}$) is connected to both the first terminal of the third bidirectional switch ($T_{53b}$) and the input terminal (B) of the second circuit module (M2). The second terminal of the third bidirectional switch ($T_{53b}$) is connected to the second terminal of the fourth bidirectional switch ($T_{54b}$). The first terminal of the fourth bidirectional switch ($T_{54b}$) is connected to the second output terminal (D) of the second circuit module (M2).

The first switching circuit branch in the second circuit module (M2) comprises the first bidirectional switch ($T_{51b}$) and the second bidirectional switch ($T_{52b}$). The second switching circuit branch comprises the third bidirectional switch ($T_{53b}$) and the fourth bidirectional switch ($T_{54b}$).

FIG. 5 (c) shows the third schematic circuit diagram of the second circuit module M2 according to an embodiment of the invention. The second circuit module (M2) comprises a first bidirectional switch ($T_{51c}$), a second bidirectional switch ($T_{52c}$), a third bidirectional switch ($T_{53c}$), a fourth bidirectional switch ($T_{54c}$), a first diode ($D_{51c}$), a second diode ($D_{52c}$), a third diode ($D_{53c}$) and a fourth diode ($D_{54c}$).

The first terminal of the first bidirectional switch ($T_{51c}$) is connected to both the negative terminal of the third diode ($D_{53c}$) and the first output terminal (C) of the second circuit module (M2), and the second terminal of the first bidirectional switch ($T_{51c}$) is connected to the positive terminal of the first diode ($D_{51c}$). The negative terminal of the first diode ($D_{53c}$) is connected to both the first terminal of the second bidirectional switch ($T_{52c}$) and the input terminal (B) of the second circuit module (M2). The second terminal of the second bidirectional switch ($T_{52c}$) is connected to the positive terminal of the second diode ($D_{52c}$). The positive terminal of the third diode ($D_{53c}$) is connected to the second terminal of the third bidirectional switch ($T_{53c}$). The first terminal of the third bidirectional switch ($T_{53c}$) is connected to both the negative terminal of the fourth diode ($D_{54c}$) and the input terminal (B) of the second circuit module (M2) and the positive terminal of the fourth diode ($D_{54c}$) is connected to the second terminal of the fourth bidirectional switch ($T_{54c}$). The first terminal of the fourth bidirectional switch ($T_{54c}$) is connected to both the negative terminal of the second diode ($D_{52c}$) and the second output terminal (D) of the second circuit module (M2).

The first switching circuit branch in the second circuit module (M2) comprises the first bidirectional switch ($T_{51c}$) and the first diode ($D_{51c}$), or comprises the third bidirectional switch ($T_{53c}$) and the third diode ($D_{53c}$). The second switching circuit branch comprises the second bidirectional switch ($T_{52c}$) and the second diode ($D_{52c}$), or comprises the fourth bidirectional switch ($T_{54c}$) and the fourth diode ($D_{54c}$).

FIG. 5 (d) shows the fourth schematic circuit diagram of the second circuit module M2 according to an embodiment of the invention. The second circuit module (M2) comprises a first reverse blocking IGBT (RB-IGBT) and a second reverse blocking IGBT (RB-IGBT).

The first reverse blocking IGBT (RB-IGBT) connects the input terminal (B) to the first output terminal (C) of the second circuit module (M2) and the second reverse blocking IGBT (RB-IGBT) connects the input terminal (B) to the second output terminal (D) of the second circuit module (M2).

The first switching circuit branch in the second circuit module (M2) comprises the first reverse blocking IGBT (RB-IGBT) and the second switching circuit branch comprises the second reverse blocking IGBT (RB-IGBT).

The reverse blocking IGBTs in FIG. 5 (d) are used for the semiconductor switch in which current is controllable for both directions. So they can be replaced by the other semiconductor switch in which current is controllable for both directions.

The half bridge inverter unit further comprises a second inductor ($L_2$). The second inductor ($L_2$) connects the second output terminal (D) of the second circuit module (M2) to the AC power grid while the first output terminal (C) of the second circuit module (M2) is connected to the common terminal of the first capacitor ($C_3$) and the second capacitor ($C_2$); or the second inductor ($L_2$) connects the first output terminal (C) of the second circuit module (M2) to the AC power grid while the second output terminal (D) of the second circuit module (M2) is connected to the common terminal of the first capacitor ($C_1$) and the second capacitor ($C_2$). The second inductor ($L_2$) is used to smooth the output waveform.

The half bridge inverter unit further comprises a third capacitor ($C_3$). The third capacitor ($C_3$) is connected between the first output terminal (C) and the second output terminal (D) of the second circuit module (M2). The third capacitor ($C_3$) is used to smooth the output waveform.

A half bridge inverter unit comprises the combination of any one of the circuits in from FIG. 4(a) to FIG. 4(d) and any one of the circuits in from FIG. 5(a) to FIG. 5(d) as well as the first inductor $L_1$. It is usually used with the said first capacitor $C_1$ and the second $C_2$. It further includes the second inductor $L_2$ and/or the third capacitor $C_3$.

A single phase half bridge inverter comprises the said half bridge inverter unit and a controller that provides control signals for each bidirectional switch in the half bridge inverter unit so that each bidirectional switch is driven by its own control signal. Four single phase half bridge inverters are shown respectively in from FIG. 6 to FIG. 9. As shown in the four figures, the first inductor ($L_1$) shares a magnetic core with the second inductor ($L_2$).

Figure 6:
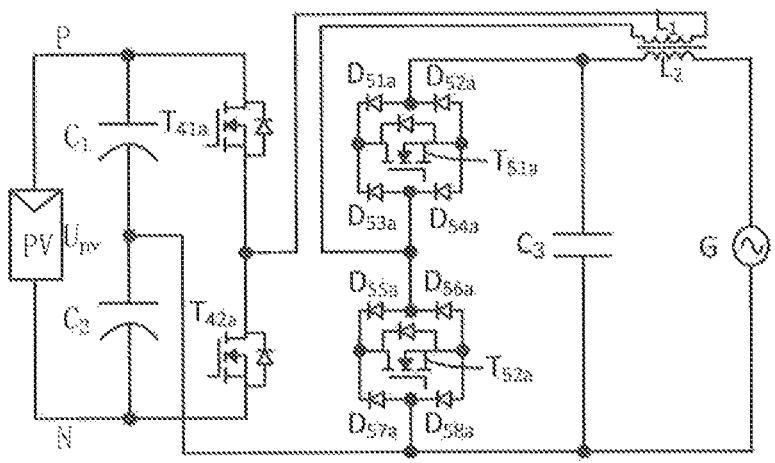
FIG. 6 is the schematic circuit diagram of the first kind of single phase half bridge inverter with the first circuit module M1 shown in FIG. 4(*a*) and with the second circuit module M2 shown in FIG. 5(*a*) and meanwhile the first inductor $L_1$ and the second inductor $L_2$ share the magnetic core according to an embodiment of the invention.

The single phase half bridge inverter in FIG. 6 comprises the first circuit module (M1) in FIG. 4(a), the second circuit module (M2) in FIG. 5(a), the first inductor ($L_1$), the second inductor ($L_2$) and the third capacitor ($C_3$). As shown in FIG. 6, the bottom terminal of the third capacitor ($C_3$) is connected to the common terminal of the first capacitor ($C_1$) and the second capacitor ($C_2$). The second inductor ($L_2$) is connected between the top terminal of the third capacitor ($C_3$) and AC power grid.

Figure 7:
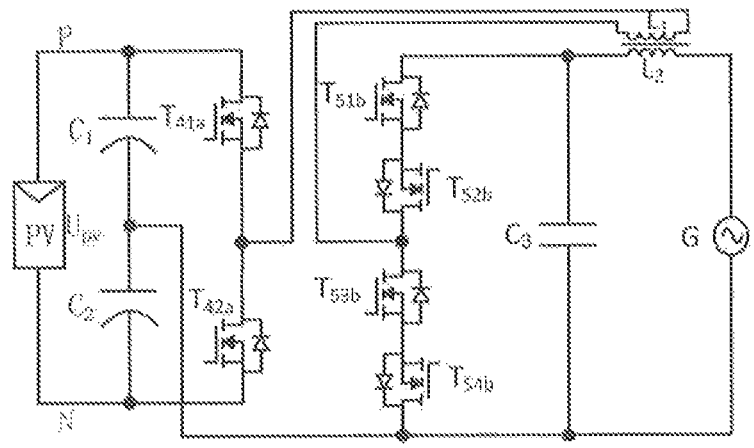
FIG. 7 is the schematic circuit diagram of the first kind of single phase half bridge inverter with the first circuit module M1 shown in FIG. 4(*a*) and with the second circuit module M2 shown in FIG. 5(*b*) and meanwhile the first inductor $L_1$ and the second inductor $L_2$ share the magnetic core according to an embodiment of the invention.
Figure 8:
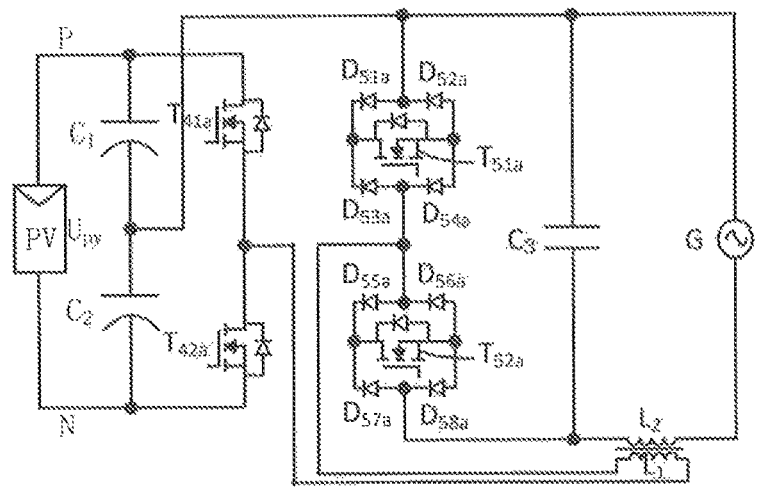
FIG. 8 is the schematic circuit diagram of the second kind of single phase half bridge inverter with the first circuit module M1 shown in FIG. 4(*a*) and with the second circuit module M2 shown in FIG. 5(*a*) and meanwhile the first inductor $L_1$ and the second inductor $L_2$ share the magnetic core according to an embodiment of the invention.
Figure 9:
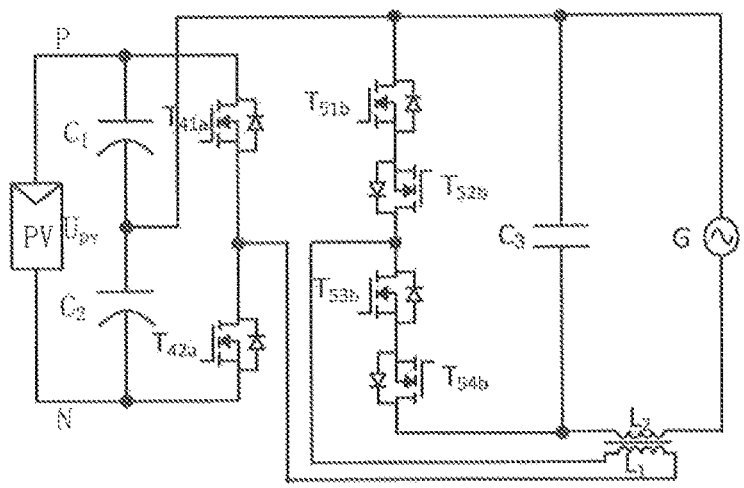
FIG. 9 is the schematic circuit diagram of the second kind of single phase half bridge inverter with the first circuit module M1 shown in FIG. 4(*a*) and with the second circuit module M2 shown in FIG. 5(*b*) and meanwhile the first inductor $L_1$ and the second inductor $L_2$ share the magnetic core according to an embodiment of the invention.

The difference between the inverters in FIG. 7 and FIG. 6 is that the inverter in FIG. 7 comprises the second circuit module (M2) in FIG. 5(b) instead of FIG. 5(a). The difference between the inverters in FIG. 8 and FIG. 6 is that the top terminal of the third capacitor ($C_3$) is connected to the common terminal of the first capacitor ($C_1$) and the second capacitor ($C_2$) and that the second inductor ($L_2$) is connected between the bottom terminal of the third capacitor ($C_3$) and AC power grid for the inverter in FIG. 8. The difference between the inverters in FIG. 9 and FIG. 8 is that the inverter in FIG. 9 comprises the second circuit module (M2) in FIG. 5(b) instead of FIG. 5(a).

Figure 10:
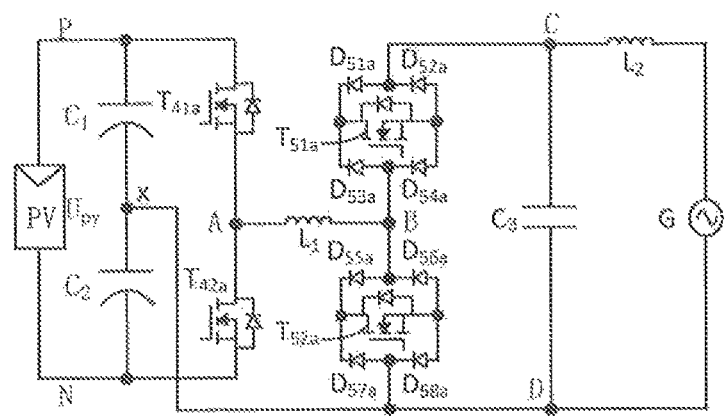
FIG. 10 is the schematic circuit diagram of the first kind of single phase half bridge inverter with the first circuit module M1 shown in FIG. 4(*a*) and with the second circuit module M2 shown in FIG. 5(*a*) and meanwhile the first inductor $L_1$ and the second inductor $L_2$ don't share the magnetic core according to an embodiment of the invention.

Take the single phase half bridge inverter in FIG. 10 for example to illustrate its operational modes.

FIG. 10 is the schematic circuit diagram of a single phase half bridge inverter according to an embodiment of the invention. It comprises a controller and a half bridge inverter unit including the circuits in both FIG. 4(a) and FIG. 5(a), the first inductor ($L_1$), the second inductor ($L_2$) and the third capacitor ($C_3$). It is used with the said first capacitor ($C_1$) and the second ($C_2$). The second inductor ($L_2$) connects the first output terminal (C) of the second circuit module (M2) to one terminal of AC power grid while the second output terminal (D) is connected to both the other terminal of AC power grid and the common terminal of the first capacitor ($C_1$) and the second capacitor ($C_2$).

Suppose the capacity of the first capacitor ($C_1$) is equal to that of the second ($C_2$) according to the embodiment. So both the said first capacitor voltage and the said second capacitor voltage are half of $U_{PV}$. Of course, in the invention it is not limited to the relationships in value of the capacity of the first capacitor ($C_1$) and that of the second ($C_2$). The current in the first inductor ($L_1$) flowing from left to right in circuits from FIG. 11 to FIG. 14 is defined as positive current and the opposite as negative current. For the sake of brevity, the term "$U_m$" as used herein is intended to refer to the minimum input voltage of the half bridge inverter. The minimum input voltage $U_m$ is equal to be the peak-peak value of grid voltage according to the embodiment of the invention.

Figure 11:
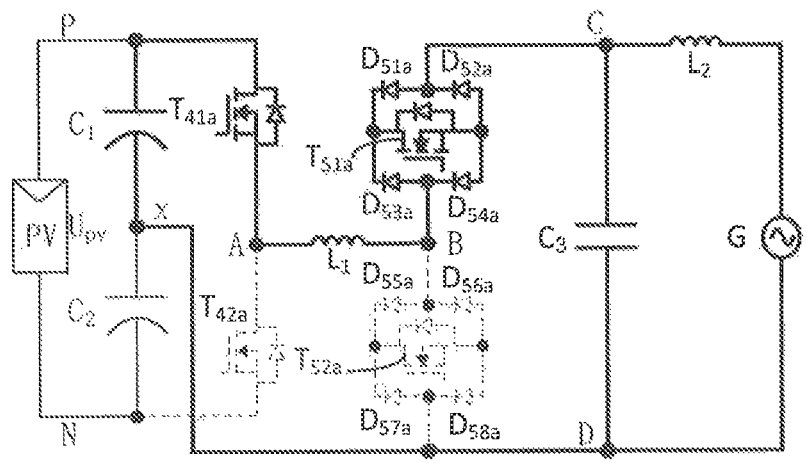
FIG. 11 is the first operational mode diagram of the single phase half bridge inverter in FIG. 10 according to an embodiment of the invention.

FIG. 11 is the first operational mode diagram of the single phase half bridge inverter according to an embodiment of the invention. As shown in FIG. 11, the positive current is as follows:
$X \rightarrow C_1 \rightarrow P \rightarrow T_{41a} \rightarrow L_1 \rightarrow D_{53a} \rightarrow T_{51a} \rightarrow D_{52a} \rightarrow L_2 \rightarrow G \rightarrow X$, and the negative current is: $X \rightarrow G \rightarrow L_2 \rightarrow D_{51a} \rightarrow T_{51a} \rightarrow D_{54a} \rightarrow L_1 \rightarrow T_{41a} \rightarrow C_1 \rightarrow X$.

Figure 12:
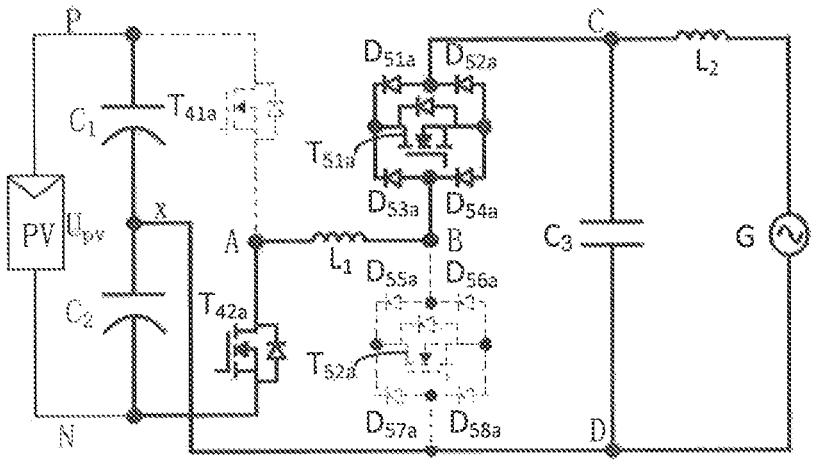
FIG. 12 is the second operational mode diagram of the single phase half bridge inverter in FIG. 10 according to an embodiment of the invention.

FIG. 12 is the second operational mode diagram of the single phase half bridge inverter according to an embodiment of the invention. As shown in FIG. 12, the positive current is as follows:
$X \rightarrow C_2 \rightarrow N \rightarrow T_{42a} \rightarrow L_1 \rightarrow D_{53a} \rightarrow T_{51a} \rightarrow D_{52a} \rightarrow L_2 \rightarrow G \rightarrow X$, and the negative current is: $X \rightarrow G \rightarrow L_2 \rightarrow D_{51a} \rightarrow T_{51a} \rightarrow D_{54a} \rightarrow L_1 \rightarrow T_{42a} \rightarrow C_2 \rightarrow X$.

Figure 13:
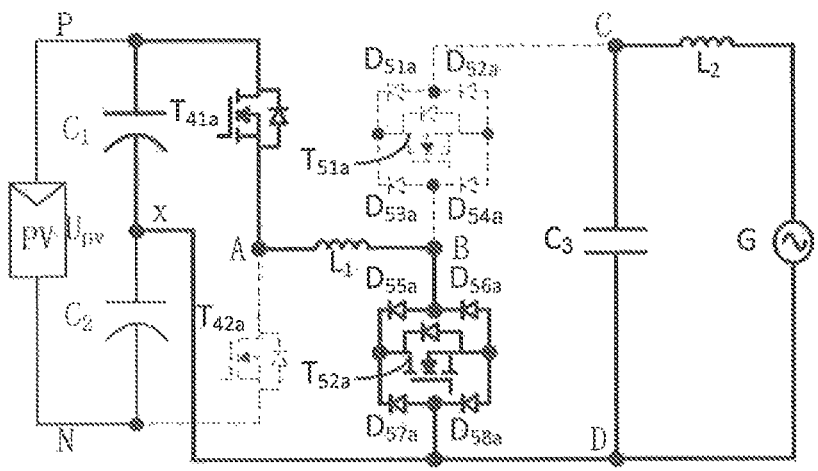
FIG. 13 is the third operational mode diagram of the single phase half bridge inverter in FIG. 10 according to an embodiment of the invention.

FIG. 13 is the third operational mode diagram of the single phase half bridge inverter according to an embodiment of the invention. As shown in FIG. 13, the positive current is as follows:
$X \rightarrow C_1 \rightarrow P \rightarrow T_{41a} \rightarrow L_1 \rightarrow D_{55a} \rightarrow T_{52a} \rightarrow D_{58a} \rightarrow X$, and the negative current is: $X \rightarrow D_{57a} \rightarrow T_{52a} \rightarrow D_{56a} \rightarrow L_1 \rightarrow T_{41a} \rightarrow P \rightarrow C_1 \rightarrow X$.

Figure 14:
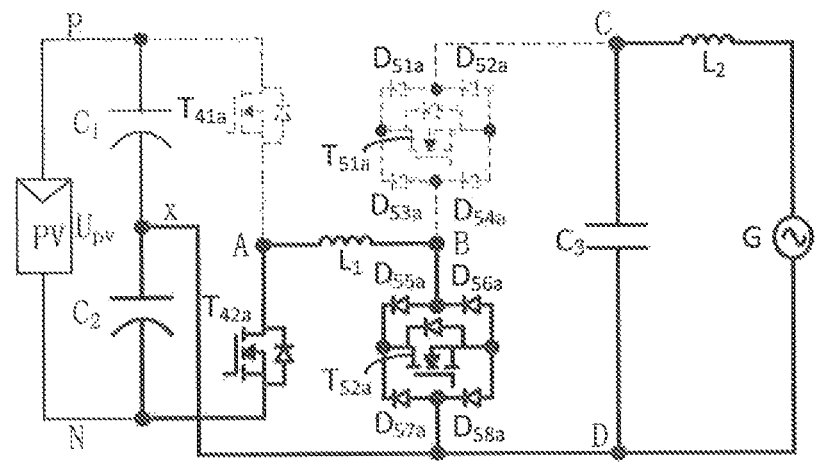
FIG. 14 is the fourth operational mode diagram of the single phase half bridge inverter in FIG. 10 according to an embodiment of the invention.

FIG. 14 is the fourth operational mode diagram of the single phase haft bridge inverter according to an embodiment of the invention. As shown in FIG. 14, the positive current is as follows:
$X \rightarrow C_2 \rightarrow N \rightarrow T_{42a} \rightarrow L_1 \rightarrow D_{55a} \rightarrow T_{52a} \rightarrow D_{58a} \rightarrow X$, and the negative current is: $X \rightarrow D_{57a} \rightarrow T_{52a} \rightarrow D_{56a} \rightarrow L_1 \rightarrow T_{42a} \rightarrow C_2 \rightarrow X$.

The single phase half bridge inverter works alternately among the four operational modes above-mentioned by controlling either of the on and off states of each switch to output the expected voltage. For the sake of brevity, the terms "a", "b", "c" and "d" as used herein are intended to respectively refer to the first, the second, the third and the fourth operational modes of the single phase half bridge inverter.

Figure 15:
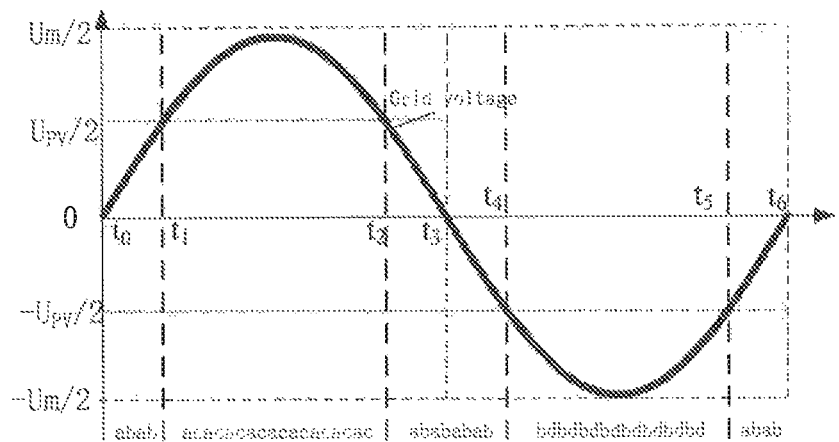
FIG. 15 is the first modulation mode diagram of the single phase half bridge inverter in FIG. 10 according to an embodiment of the invention.

FIG. 15 is the first modulation mode diagram of a single phase half bridge inverter according to an embodiment of the invention where the DC voltage $U_{PV}$ is less than the minimum input voltage $U_m$.

As shown in FIG. 15, the absolute value of grid voltage is less than haft of $U_{PV}$ during the time slots of $t_0$-$t_1$, $t_2$-$t_4$ and $t_5$-$t_6$. The inverter works alternately in the first operational mode and the second. The half bridge inverter unit operates in a buck mode.

It is in positive half cycle of grid voltage during the time slot of $t_1$-$t_2$. The value of grid voltage is more than half of $U_{PV}$ but less than half of $U_m$. The inverter works alternately in the first operational mode and the third. The half bridge inverter unit operates in a boost mode.

It is in negative half cycle of grid voltage during the time slot of $t_4$-$t_5$. The absolute value of grid voltage is more than half of $U_{PV}$ but less than half of $U_m$. The inverter works alternately in the second operational mode and the fourth. The half bridge inverter unit operates in a boost mode.

Figure 16:
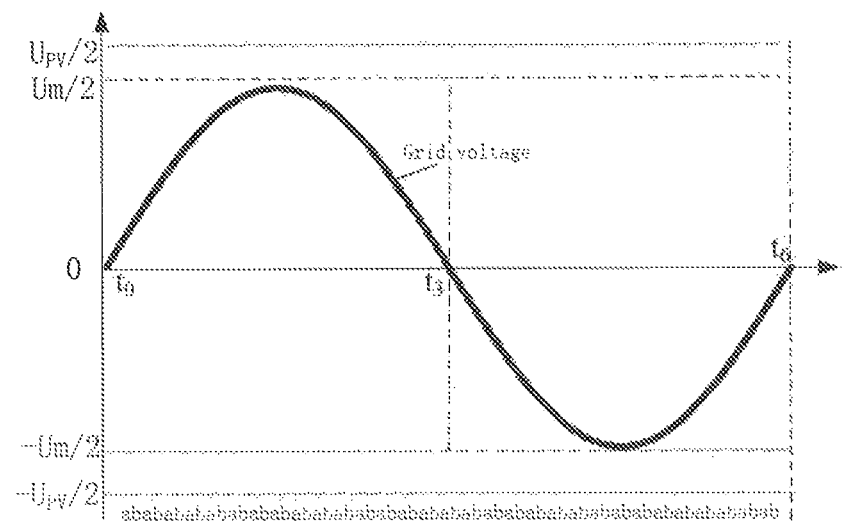
FIG. 16 is the second modulation mode diagram of the single phase half bridge inverter in FIG. 10 according to an embodiment of the invention.

FIG. 16 is the second modulation mode diagram of a single phase half bridge inverter according to an embodiment of the invention where the DC voltage $U_{PV}$ is more than the minimum input voltage $U_m$. The inverter works alternately in the first operational mode and the second during the whole cycle. The half bridge inverter unit operates in a buck mode.

It is observed from the above analysis about the operational modes and modulation modes that the second inductor ($L_2$) can be absent in practical situations. The third capacitor ($C_3$) can also be absent. The first capacitor ($C_1$) and the second capacitor ($C_2$) are used as DC power supply and can be replaced by the other DC power supplies which can provide three voltage levels.

It is easy to find from the above two modulation modes that it can meet the requirement of a wide range of input voltage for the inverter as the half bridge inverter unit operates in either a buck mode or a boost mode according to the specific modulation modes. So it can be used with multiple photovoltaic arrays connected in series. There is a bidirectional DC-DC converter between the multiple photovoltaic arrays and the half bridge inverter unit connected in parallel with two series capacitors. The bidirectional DC-DC converter is mainly used to achieve maximum power point tracking (MPPT). It doesn't matter whether the numbers of photovoltaic cells in multiple photovoltaic arrays are equal. It improves system efficiency and reduces cost.

Figure 17:
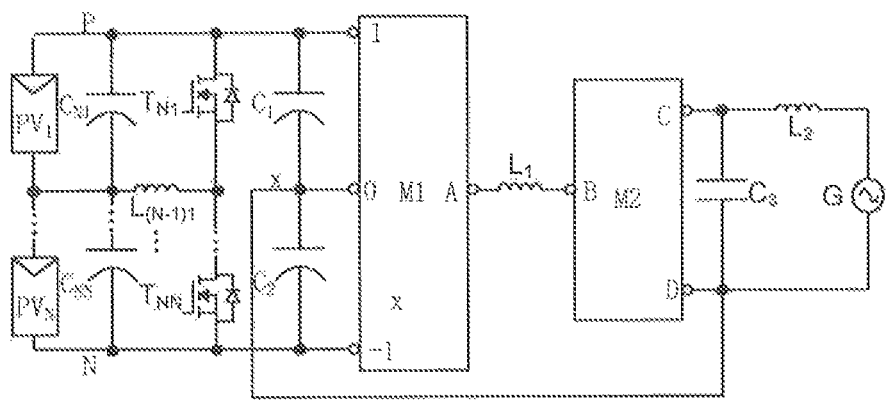
FIG. 17 is the circuit diagram in partial block form of the first kind of single phase half bridge inverter applied in photovoltaic system with multiple photovoltaic arrays according to an embodiment of the invention.

Suppose the number of photovoltaic arrays is N. As shown in FIG. 17, the bidirectional DC-DC converter comprises N capacitors ($C_{N1}$, ... $C_{NN}$), N bidirectional switches ($T_{N1}$, ... $T_{NN}$) and (N−1) inductors ($L_{N1}$, ... $L_{N(N-1)}$). Each photovoltaic array is connected in parallel with a capacitor. The first terminal of a first bidirectional switch ($T_{N1}$) is connected to both the positive terminal of the first photovoltaic array ($PV_1$) and that of the said first capacitor ($C_1$). The second terminal of the first bidirectional switch ($T_{N1}$) is connected to the common terminal of the first and the second photovoltaic arrays through the first inductor ($L_{N1}$). At the same time, the second terminal of the first bidirectional switch ($T_{N1}$) is connected to the first terminal of the second bidirectional switch ($T_{N2}$). The second terminal of the second bidirectional switch ($T_{N2}$) is connected to the common terminal of the second and the third photovoltaic arrays through the second inductor ($L_{N2}$). The second terminal of the second bidirectional switch ($T_{N2}$) is also connected to the first terminal of the third bidirectional switch ($T_{N3}$). For the bidirectional DC-DC converter, the connections among the other elements but the $N^{th}$ bidirectional switch ($T_{NN}$) are in the same way. The first terminal of the $N^{th}$ bidirectional switch ($T_{NN}$) is connected to both the second terminal of the $(N-1)^{th}$ bidirectional switch ($T_{N(N-1)}$) and the common terminal of the $(N-1)^{th}$ and the $N^{th}$ photovoltaic arrays through the $(N-1)^{th}$ inductor ($L_{N(N-1)}$). The second terminal of the $N^{th}$ bidirectional switch ($T_{NN}$) is connected to both the negative terminal of the $N^{th}$ photovoltaic array ($PV_N$) and that of the said second capacitor ($C_2$).

Figure 18:
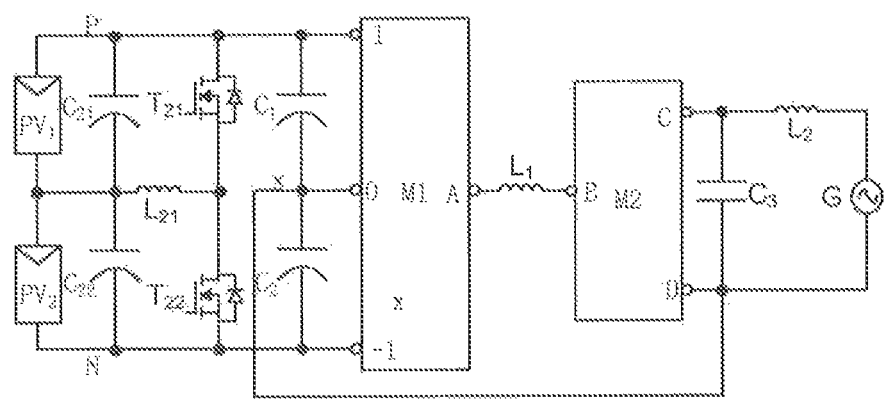
FIG. 18 is the circuit diagram in partial block form of the first kind of single phase half bridge inverter applied in photovoltaic system with two photovoltaic arrays according to an embodiment of the invention.

FIG. 18 is the first circuit diagram in partial block form of a single phase half bridge inverter applied in photovoltaic system with two photovoltaic arrays connected in series according to an embodiment of the invention.

As shown in FIG. 18, the bidirectional DC-DC converter comprises two capacitors ($C_{21}$, $C_{22}$), an inductor ($L_{21}$), a first bidirectional switch ($T_{21}$) and a second bidirectional switch ($T_{22}$). Each photovoltaic array is connected in parallel with a capacitor. The first terminal of the first bidirectional switch ($T_{21}$) is connected to both the positive terminal of the first photovoltaic array ($PV_1$) and the upper input terminal ($I_+$) of the first circuit module (M1). The second terminal of the first bidirectional switch ($T_{21}$) is connected to both the common terminal of the first and the second photovoltaic arrays through the inductor ($L_{21}$) and to the first terminal of the second bidirectional switch ($T_{22}$). The second terminal of the second bidirectional switch ($T_{22}$) is connected to both the negative terminal of the second photovoltaic array ($PV_2$) and the lower input terminal ($I_-$) of the first circuit module (M1). The first output terminal (C) of the second circuit module (M2) is connected to AC power grid through another inductor ($L_2$) and the second output terminal (D) of the second circuit module (M2) is connected to both AC power grid and the common terminal of the first capacitor ($C_1$) and the second capacitor ($C_2$).

Figure 19:
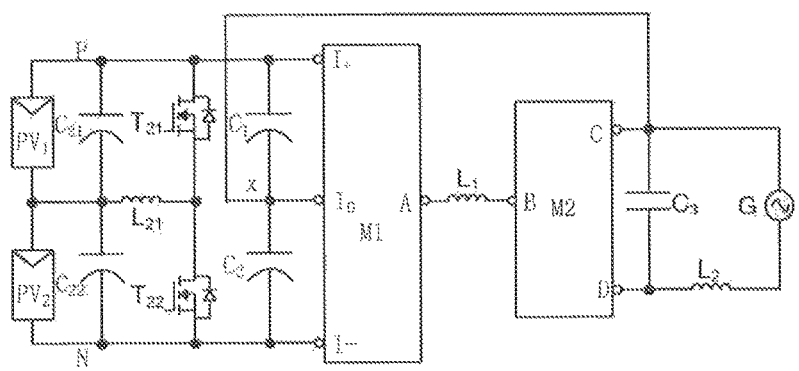
FIG. 19 is the circuit diagram in partial block form of the second kind of single phase half bridge inverter applied in photovoltaic system with two photovoltaic arrays according to an embodiment of the invention.

FIG. 19 is the second circuit diagram in partial block form of a single phase half bridge inverter applied in photovoltaic system with two photovoltaic arrays according to an embodiment of the invention. The bidirectional DC-DC converters in FIG. 18 and FIG. 19 are identical. For the sake of brevity, it is not described repeatedly here. The difference between the inverters in FIG. 19 and FIG. 18 is that the first output terminal (C) of the second circuit module (M2) is connected to the common terminal of the first capacitor ($C_1$) and the second capacitor ($C_2$) and the second output terminal (D) of the second circuit module (M2) is connected to AC power grid through the inductor ($L_2$) for the inverter in FIG. 19.

It is observed from the accompanying drawings and the above analysis that one terminal of AC power grid is connected to the midpoint of DC power supply. The parasitic capacitor voltage is constant so that the leakage current is eliminated substantially.

Figure 20:
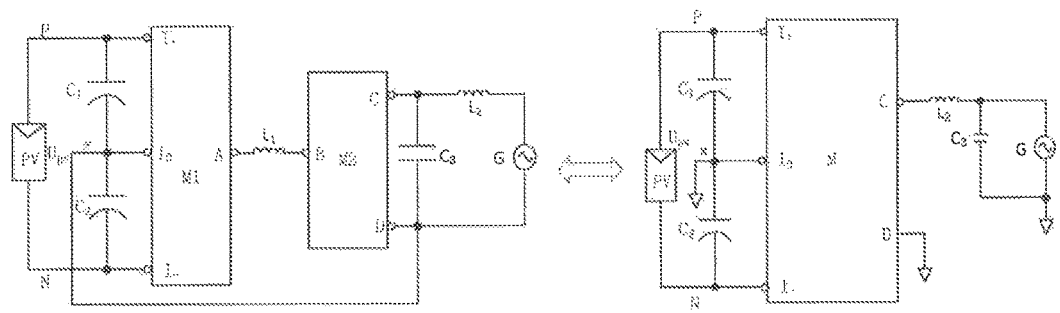
FIG. 20(*a*) is an equivalent block diagram of the first kind of single phase half bridge inverter according to an embodiment of the invention.
Figure 20:
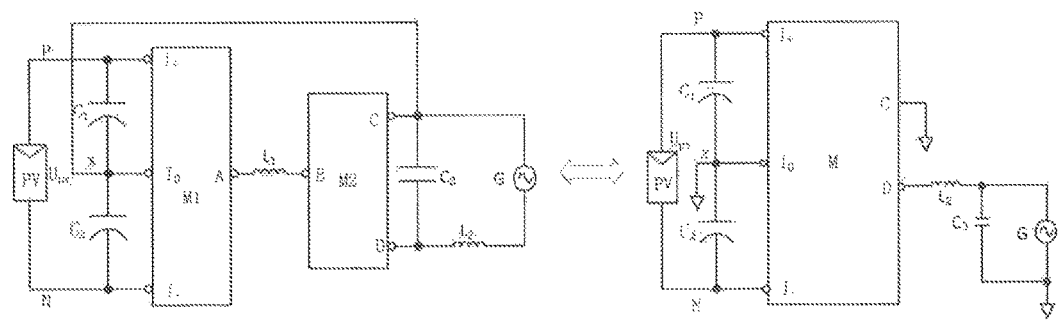

FIG. 20(a) is an equivalent block diagram of a single phase half bridge inverter with the second output terminal (D) of the second circuit module (M2) connected to the common terminal of the first capacitor ($C_1$) and the second capacitor ($C_2$). FIG. 20(b) is an equivalent block diagram of a single phase half bridge inverter with the first output terminal (C) of the second circuit module (M2) connected to the common terminal of the first capacitor ($C_1$) and the second capacitor ($C_2$). The said half bridge inverter unit is equivalent to a circuit module (M). The upper input terminal the middle input terminal ($I_0$) and the lower input terminal ($I_-$) of the first circuit module (M1) are respectively used as that of the circuit module (M). The first output terminal (C) and the second output terminal (D) of the second circuit module (M2) are respectively used as that of the circuit module (M).

Also provided herein are three-phase half bridge inverters shown in FIG. 21(a), FIG. 21(b), FIG. 21(c) and FIG. 21(d).

The three-phase half bridge inverter comprises three circuit modules (M) sharing the first capacitor ($C_1$) and the second capacitor ($C_2$), and a controller that provides control signals for each bidirectional switch in the three circuit modules (M) so that each bidirectional switch is driven by its own control signal.

Figure 21:
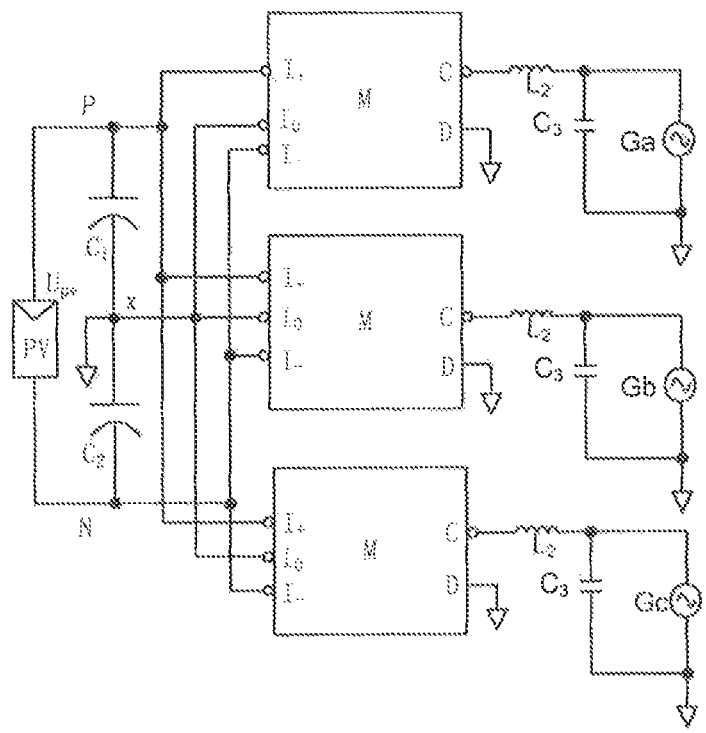
FIG. 21(*a*) is the circuit diagram in partial block form of a first kind of three-phase half bridge inverter based on the equivalent circuit in FIG. 20(*a*) according to an embodiment of the invention.
Figure 21:
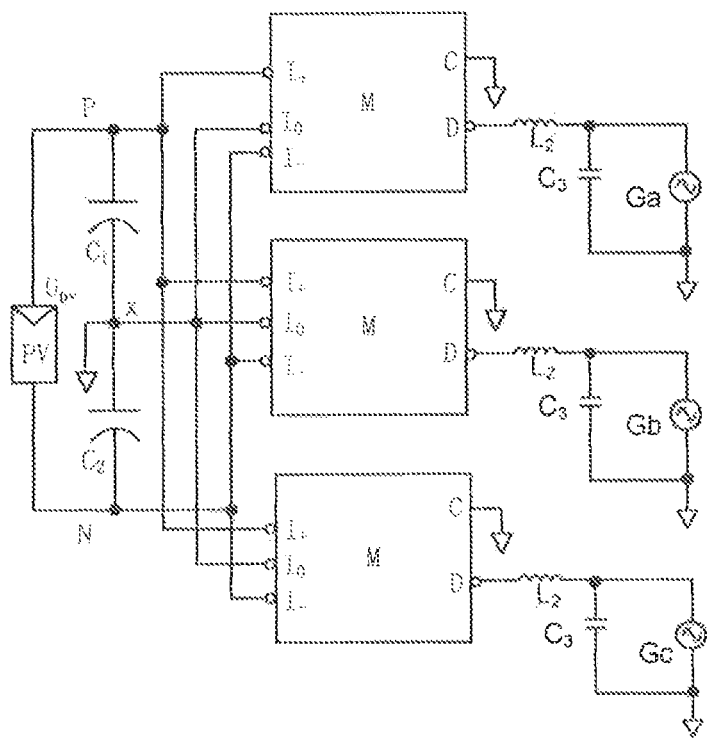
Figure 21:
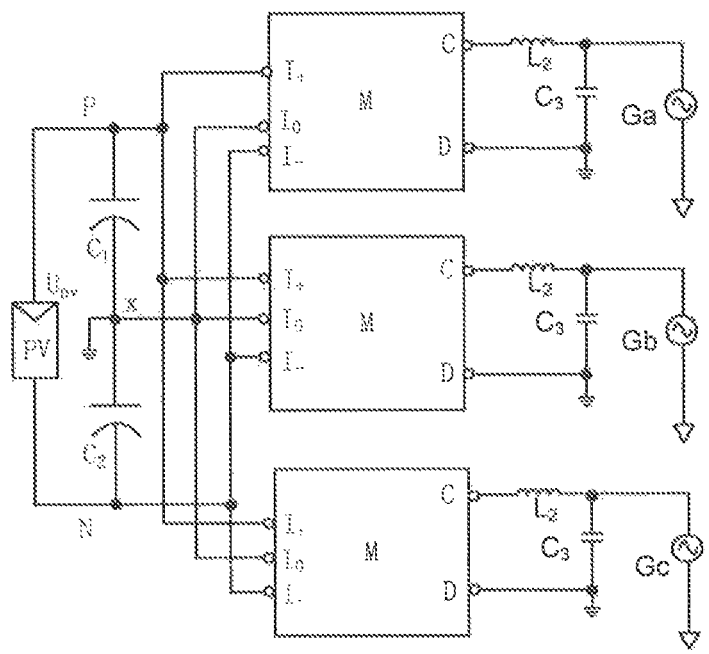
Figure 21:
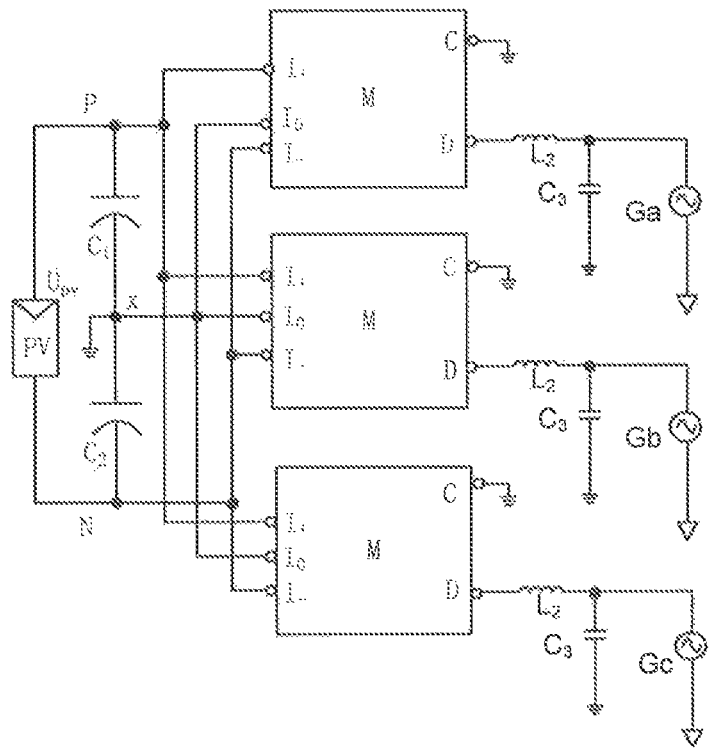

As shown in FIG. 21, all the upper input terminals ($I_+$) of the three circuit modules (M) are connected to the positive terminal of the first capacitor ($C_1$); all the middle input terminals ($I_0$) of the three circuit modules (M) are connected to the common terminal of the first capacitor ($C_1$) and the second capacitor ($C_2$); all the lower input terminals ($I_-$) of the three circuit modules (M) are connected to the negative terminal of the second capacitor ($C_2$); all the first output terminals (C) of the three circuit modules (M) are connected respectively to three phase terminals of AC power grid through the inductor ($L_2$) while all the second output terminals (D) are connected to the common terminal of the first capacitor ($C_1$) and the second capacitor ($C_2$) (FIGS. 21(a) and 21(c)), or all the second output terminals (D) of the three circuit modules (M) are connected respectively with three phase terminals of AC power grid through the inductor ($L_2$) while all the first output terminals (C) are connected to the common terminal of the first capacitor ($C_1$) and the second capacitor ($C_2$) (FIGS. 21(b) and 21(d)).

As shown in FIG. 21(a) and FIG. 21(b), the neutral terminal of AC power grid is connected to the common terminal of the first capacitor ($C_1$) and the second capacitor ($C_2$) to form a three-phase four-wire system. As shown in FIG. 21(c) and FIG. 21(d), the neutral terminal of AC power grid is not connected to the common terminal of the first capacitor ($C_1$) and the second capacitor ($C_2$) to form a three-phase three-wire system.

As one terminal of AC power grid is connected to the mid-point of DC power supply, the parasitic capacitor voltage is constant so that the leakage current is eliminated substantially. As the grid voltage is symmetry in two half cycles, the mid-point voltage of the two series capacitors connected in parallel to DC power supply is balanced automatically. It achieves low cost, high efficiency and reliability by using single stage structure with low power loss.

The half bridge inverter unit and inverter thereof provided in the invention can be used for, but not limited to, renewable energy power system, such as single-phase or three-phase grid-connected photovoltaic system.

Each embodiment in the part of the detailed description of the embodiments goes forward one by one. The differences among the embodiments are focused on, and it is easy to understand the same or similar among all the embodiments by making a cross-reference.

Note that the relationship terms like "first", "second", "upper", "lower" and so on are used in the invention just to separate one thing or operation from the other and not to indicate any real relationship or sequence among them.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A half bridge inverter unit, comprising an inverter controlling module and a first inductor, has a first input terminal, a second input terminal, a third input terminal, a first voltage output terminal, a second voltage output terminal and several controlling terminals;

wherein the inverter controlling module is connected to all the three input terminals, the two voltage output terminals, two terminals of the first inductor and the several controlling terminals;

based on the controlling signals from the controlling terminals under a first operation mode, the inverter controlling module makes current flow between a first terminal of the first inductor and the first input terminal and between a second terminal of the first inductor and the first voltage output terminal;

based on the controlling signals from the controlling terminals under a second operation mode, the inverter controlling module makes current flow between the first terminal of the first inductor and the second input terminal and between the second terminal of the first inductor and the first voltage output terminal;

based on the controlling signals from the controlling terminals under a third operation mode, the inverter controlling module makes current flow between the first terminal of the first inductor and the first input terminal and between the second terminal of the first inductor and the second voltage output terminal;

based on the controlling signals from the controlling terminals under a fourth operation mode, the inverter controlling module makes current flow between the first terminal of the first inductor and the second input terminal and between the second terminal of the first inductor and the second voltage output terminal.

2. The half bridge inverter unit of claim 1, wherein either the first voltage output terminal or the second voltage output terminal is connected to the third input terminal.

3. The half bridge inverter unit of claim 2, wherein the inverter controlling module comprises a first circuit module and a second circuit module;
the first circuit module is connected to all the three input terminals, the first terminal of the first inductor and some of the several controlling terminals;
the first circuit module provides at least two operation modes based on the controlling signals from the controlling terminals: (1) current flows between the first terminal of the first inductor and the first input terminal; (2) current flows between the first terminal of the first inductor and the second input terminal;
the second circuit module is connected to the two voltage output terminals, the second terminal of the first inductor and some of the several controlling terminals;
the second circuit module provides at least two operation modes based on the controlling signals from the controlling terminals: (1) current flows between the second terminal of the first inductor and the first voltage output terminal; (2) current flows between the second terminal of the first inductor and the second voltage output terminal.

4. The half bridge inverter unit of claim 3, wherein the first circuit module comprises at least an upper input terminal, a middle input terminal, a lower input terminal, an output terminal, a first switching circuit branch and a second switching circuit branch;
the upper input terminal of the first circuit module is connected to the first input terminal of the half bridge inverter unit; the middle input terminal of the first circuit module is connected to the third input terminal of the half bridge inverter unit; the lower input terminal of the first circuit module is connected to the second input terminal of the half bridge inverter unit; the output terminal of the first circuit module is connected to the first terminal of the first inductor;
the first switching circuit branch in the first circuit module is connected between the upper input terminal and the output terminal of the first circuit module;
the second switching circuit branch in the first circuit module is connected between the lower input terminal and the output terminal of the first circuit module.

5. The half bridge inverter unit of claim 4, wherein the first circuit module further comprises a third switching circuit branch;
the third switching circuit branch in the first circuit module is connected between the middle input terminal and the output terminal of the first circuit module.

6. The half bridge inverter unit of claim 5, wherein the first circuit module comprises a first bidirectional switch, a second bidirectional switch, a third bidirectional switch, a fourth bidirectional switch, a first diode and a second diode;
the first terminal of the first bidirectional switch is connected to the upper input terminal of the first circuit module;
the second terminal of the first bidirectional switch is connected to both the negative terminal of the first diode and the first terminal of the second bidirectional switch;
the second terminal of the second bidirectional switch is connected to both the first terminal of the third bidirectional switch and the output terminal of the first circuit module;
the second terminal of the third bidirectional switch is connected to both the positive terminal of the second diode and the first terminal of the fourth bidirectional switch;
the second terminal of the fourth bidirectional switch is connected to the lower input terminal of the first circuit module;
the positive terminal of the first diode is connected to the negative terminal of the second diode;
the common terminal of the first diode and the second diode is connected to the middle input terminal of the first circuit module.

7. The half bridge inverter unit of claim 5, wherein the first circuit module comprises a first bidirectional switch, a second bidirectional switch, a third bidirectional switch, and a fourth bidirectional switch;
the first terminal of the first bidirectional switch is connected to the upper input terminal of the first circuit module;
the second terminal of the first bidirectional switch is connected to both the output terminal of the first circuit module and the first terminal of the fourth bidirectional switch;
the second terminal of the fourth bidirectional switch is connected to the lower input terminal of the first circuit module;
the first terminal of the second bidirectional switch is connected to the middle input terminal of the first circuit module;
the second terminal of the second bidirectional switch is connected to the second terminal of the third bidirectional switch;
the first terminal of the third bidirectional switch is connected to the output terminal of the first circuit module.

8. The half bridge inverter unit of claim 5, wherein the first circuit module comprises a first bidirectional switch, a second bidirectional switch, a third bidirectional switch, a first diode, a second diode, a third diode and a fourth diode;
the first terminal of the first bidirectional switch is connected to the upper input terminal of the first circuit module;

the second terminal of the first bidirectional switch is connected to both the output terminal of the first circuit module and the first terminal of the third bidirectional switch;

the second terminal of the third bidirectional switch is connected to the lower input terminal of the first circuit module;

the positive terminal of the first diode is connected to both the negative terminal of the second diode and the middle input terminal of the first circuit module;

the negative terminal of the first diode is connected to both the negative terminal of the third diode and the first terminal of the second bidirectional switch;

the positive terminal of the second diode is connected to both the positive terminal of the fourth diode and the second terminal of the second bidirectional switch;

the positive terminal of the third diode is connected to both the negative terminal of the fourth diode and the output terminal of the first circuit module.

9. The half bridge inverter unit of claim 4, wherein the first circuit module comprises a first bidirectional switch and a second bidirectional switch;

the first terminal of the first bidirectional switch is connected to the upper input terminal of the first circuit module;

the second terminal of the first bidirectional switch is connected to both the output terminal of the first circuit module and the first terminal of the second bidirectional switch;

the second terminal of the second bidirectional switch is connected to the lower input terminal of the first circuit module.

10. The half bridge inverter unit of claim 3, wherein the second circuit module comprises at least an input terminal, a first output terminal, a second output terminal, a first switching circuit branch and a second switching circuit branch;

the input terminal of the second circuit module is connected to the second terminal of the first inductor;

the first output terminal of the second circuit module is connected to the first voltage output terminal of the half bridge inverter unit; the second output terminal of the second circuit module is connected to the second voltage output terminal of the half bridge inverter unit;

the first output terminal of the second circuit module is connected to the third input terminal of the half bridge inverter unit, or the second output terminal of the second circuit module is connected to the third input terminal of the half bridge inverter unit;

the first switching circuit branch in the second circuit module is connected between the input terminal and the first output terminal of the second circuit module;

the second switching circuit branch in the second circuit module is connected between the input terminal and the second output terminal of the second circuit module.

11. The half bridge inverter unit of claim 10, wherein the second circuit module comprises a first bidirectional switch, a second bidirectional switch, a first diode, a second diode, a third diode, a fourth diode, a fifth diode, a sixth diode, a seventh diode and an eighth diode;

the negative terminal of the first diode is connected to both the negative terminal of the third diode and the first terminal of the first bidirectional switch;

the positive terminal of the first diode is connected to both the negative terminal of the second diode and the first output terminal of the second circuit module;

the positive terminal of the second diode is connected to both the positive terminal of the fourth diode and the second terminal of the first bidirectional switch;

the positive terminal of the third diode is connected to both the negative terminal of the fourth diode and the input terminal of the second circuit module;

the negative terminal of the fifth diode is connected to both the negative terminal of the seventh diode and the first terminal of the second bidirectional switch;

the positive terminal of the fifth diode is connected to both the negative terminal of the sixth diode and the input terminal of the second circuit module;

the positive terminal of the sixth diode is connected to both the positive terminal of the eighth diode and the second terminal of the second bidirectional switch;

the positive terminal of the seventh diode is connected to both the negative terminal of the eighth diode and the second output terminal of the second circuit module.

12. The half bridge inverter unit of claim 10, wherein the second circuit module comprises a first bidirectional switch, a second bidirectional switch, a third bidirectional switch and a fourth bidirectional switch;

the first terminal of the first bidirectional switch is connected to the first output terminal of the second circuit module;

the second terminal of the first bidirectional switch is connected to the second terminal of the second bidirectional switch;

the first terminal of the second bidirectional switch is connected to both the first terminal of the third bidirectional switch and the input terminal of the second circuit module;

the second terminal of the third bidirectional switch is connected to the second terminal of the fourth bidirectional switch;

the first terminal of the fourth bidirectional switch is connected to the second output terminal of the second circuit module.

13. The half bridge inverter unit of claim 10, wherein the second circuit module comprises a first bidirectional switch, a second bidirectional switch, a third bidirectional switch, a fourth bidirectional switch, a first diode, a second diode, a third diode and a fourth diode;

the first terminal of the first bidirectional switch is connected to both the negative terminal of the third diode and the first output terminal of the second circuit module;

the second terminal of the first bidirectional switch is connected to the positive terminal of the first diode;

the negative terminal of the first diode is connected to both the first terminal of the second bidirectional switch and the input terminal of the second circuit module;

the second terminal of the second bidirectional switch is connected to the positive terminal of the second diode;

the positive terminal of the third diode is connected to the second terminal of the third bidirectional switch;

the first terminal of the third bidirectional switch is connected to both the negative terminal of the fourth diode and the input terminal of the second circuit module;

the positive terminal of the fourth diode is connected to the second terminal of the fourth bidirectional switch;

the first terminal of the fourth bidirectional switch is connected to both the negative terminal of the second diode and the second output terminal of the second circuit module.

14. The half bridge inverter unit of claim 10, wherein the second circuit module comprises a first reverse blocking IGBT and a second reverse blocking IGBT;
- the first reverse blocking IGBT is connected between the input terminal of the second circuit module and the first output terminal of the second circuit module;
- the second reverse blocking IGBT is connected between the input terminal of the second circuit module and the second output terminal of the second circuit module.

15. A single phase half bridge inverter, comprising: the half bridge inverter unit of claim 1 and a controller, wherein the controller is connected to the several controlling terminals of the half bridge inverter unit; the controller provides the half bridge inverter unit with corresponding control signals to each operation mode.

16. The single phase half bridge inverter of claim 15, further comprises a second inductor; wherein the single phase half bridge inverter has a first AC output terminal and a second AC output terminal; the second inductor is connected between the first voltage output terminal of the half bridge inverter unit and the first AC output terminal of the single phase half bridge inverter, and meanwhile both the second voltage output terminal and the third input terminal of the half bridge inverter unit are connected to the second AC output terminal of the single phase half bridge inverter; or
- the second inductor is connected between the second voltage output terminal of the half bridge inverter unit and the second AC output terminal of the single phase half bridge inverter, and meanwhile both the first voltage output terminal and the third input terminal of the half bridge inverter unit are connected to the first AC output terminal of the single phase half bridge inverter.

17. The single phase half bridge inverter of claim 16, wherein the second inductor shares the magnetic core with the first inductor in the half bridge inverter unit.

18. The single phase half bridge inverter of claim 15, further comprises a bidirectional DC-DC converter, wherein the bidirectional DC-DC converter is connected to the first and the second input terminals of the half bridge inverter unit and used to convert the received DC voltage and output it into the half bridge inverter unit through the first and the second input terminals of the half bridge inverter unit.

19. The single phase half bridge inverter of claim 18, wherein the bidirectional DC-DC converter comprises N capacitors, (N−1) inductors and N bidirectional switches where N is an integer which is more than or equals two; the N capacitors are connected in series between the first input terminal and the second input terminal of the half bridge inverter unit; the N bidirectional switches are connected in series between the first input terminal and the second input terminal of the half bridge inverter unit; the circuit branch formed by the N bidirectional switches in series is connected in parallel with the one formed by the N capacitors in series; one terminal of the $i^{th}$ inductor in the (N−1) inductors is connected between the $i^{th}$ and the $(i+1)^{th}$ capacitors where i is an integer and $1 \leq i \leq (N-1)$, and the other terminal of the $i^{th}$ inductor is connected between the $i^{th}$ and the $(i+1)^{th}$ bidirectional switches where i is an integer and $1 \leq i \leq (N-1)$.

20. A three-phase half bridge inverter, comprising: three half bridge inverter units of claim 1 and a controller;
- wherein the three-phase half bridge inverter has three AC load terminals;
- all the first input terminals of the three half bridge inverter units are connected together;
- all the second input terminals of the three half bridge inverter units are connected together;
- all the third input terminals of the three half bridge inverter units are connected together;
- the first voltage output terminals of the three half bridge inverter units are connected one to one to the three AC load terminals of the three-phase half bridge inverter and meanwhile all the second voltage output terminals are connected together, or the second voltage output terminals of the three half bridge inverter units are connected one to one to the three AC load terminals of the three-phase half bridge inverter and meanwhile all the first voltage output terminals are connected together;
- the controller is connected to the several controlling terminals of each half bridge inverter unit and provides the three half bridge inverter units with corresponding control signals to each operation mode.

21. The three-phase half bridge inverter of claim 20, wherein all the third input terminals of the three half bridge inverter units are connected to all the first voltage output terminals which are connected together; or all the third input terminals of the three half bridge inverter units are connected to all the second voltage output terminals which are connected together.

22. The three-phase half bridge inverter of claim 20, further comprises three second inductors; wherein the three second inductors are of one-to-one correspondence to both the three half bridge inverter units and the three AC load terminals;
- each of the three second inductors is connected between the second voltage output terminal of the corresponding half bridge inverter unit and the corresponding AC load terminal of the three-phase half bridge inverter, and meanwhile all the first voltage output terminals of the three half bridge inverter units are connected to the third input terminals of the half bridge inverter units; or
- each of the three second inductors is connected between the first voltage output terminal of the corresponding half bridge inverter unit and the corresponding AC load terminal of the three-phase half bridge inverter, and meanwhile all the second voltage output terminals of the three half bridge inverter units are connected to the third input terminals of the half bridge inverter units.

* * * * *